(12) United States Patent
Correll

(10) Patent No.: US 9,710,365 B2
(45) Date of Patent: Jul. 18, 2017

(54) SYSTEM AND METHOD FOR GENERATING SYNTHETIC DATA FOR SOFTWARE TESTING PURPOSES

(71) Applicant: Wal-Mart Stores, Inc., Bentonville, AR (US)

(72) Inventor: Harold Correll, Bentonville, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 243 days.

(21) Appl. No.: 14/694,387

(22) Filed: Apr. 23, 2015

(65) Prior Publication Data

US 2015/0309919 A1 Oct. 29, 2015

Related U.S. Application Data

(60) Provisional application No. 61/984,309, filed on Apr. 25, 2014.

(51) Int. Cl.
*G06F 11/00* (2006.01)
*G06F 11/36* (2006.01)

(52) U.S. Cl.
CPC ................. *G06F 11/3684* (2013.01)

(58) Field of Classification Search
USPC .......................................................... 714/33
See application file for complete search history.

(56) References Cited

U.S. PATENT DOCUMENTS

| 8,504,408 B2 | 8/2013 | Banthia et al. |
| 2006/0031718 A1 | 2/2006 | Thornhill et al. |
| 2013/0132916 A1* | 5/2013 | Ootsubo ............. G06F 17/5045 716/104 |
| 2013/0139003 A1 | 5/2013 | Patwardhan et al. |
| 2015/0019478 A1* | 1/2015 | Buehne ................ G06F 17/303 707/609 |
| 2015/0160974 A1* | 6/2015 | Kishore ............... G06F 9/4881 718/106 |

OTHER PUBLICATIONS

Alexandrov, et al., "Issues in Big Data Testing and Benchmarking", Proceedings of the Sixth International Workshop on Testing Database Systems, Jun. 24, 2013, New York, NY, Article No. 1; 5 pages.

(Continued)

*Primary Examiner* — Sarai Butler
(74) *Attorney, Agent, or Firm* — Schmeiser, Olsen & Watts LLP

(57) ABSTRACT

According to one aspect, it is appreciated that it may be useful and particularly advantageous to provide a data generator that creates more realistic data for testing purposes, especially in data systems where large volumes of data are necessary. In one implementation, a data generator is provided that produces relationally consistent data for testing purposes. For instance, a synthetic data generation process may be performed that produces any number of relationally consistent data table structures. Further, in another implementation, generation of the data can be statistically influenced so that the data generated can take on the "look and feel" of production data. Also, data may be produced as needed, and its generation may be performed in parallel, depending on interdependencies in the data.

20 Claims, 11 Drawing Sheets

(56) References Cited

OTHER PUBLICATIONS

Bisbal, et al., "Building Consistent Sample Databases to Support Information System Evolution and Migration", Proceedings of the 9th Annual Conference on Database and Expert Systems Applications, Aug. 24-28, 1998, Vienna, Austria, pp. 196-205.
Mayfield, et al., "ERACER: A Database Approach for Statistical Inference and Data Cleaning", Proceedings of the 2010 ACM SIGMOD International Conference on Management of data, Jun. 6-11, 2010, Indianapolis, IN, pp. 75-86.
Bisbal, Jesus and Jane Grimson, "Database Prototyping through Consistent Sampling", presented at the International Conference on Advances in Infrastructure for Electronic Business, Science, and Education on the Internet, Jul. 31-Aug. 6, 2000, L'Aquila, Italy, 21 pages.
Houkjaer, et al., "Simple Realistic Data Generation", Proceedings of the 32nd international conference on Very large data bases, Sep. 12-15, 2006, Seoul, South Korea, pp. 1243-1246.
Smaragdakis, et al., "Scalable Automatic Test Data Generation from Modeling Diagrams", Proceedings of the 22nd IEEE/ACM International Conference on Automated Software Engineering, Nov. 4-9, 2007, Atlanta, GA, pp. 4-13.

* cited by examiner

SYSTEM AND METHOD FOR GENERATING SYNTHETIC DATA FOR SOFTWARE TESTING PURPOSES

RELATED APPLICATIONS

This application claims benefit of U.S. Provisional Patent Application No. 61/984,309 entitled "System and Method for Generating Synthetic Data for Software Testing Purposes," filed on Apr. 25, 2014, the contents of which are incorporated herein by reference.

APPLICABLE FIELD

The invention relates generally to software application testing, and more particularly, to data generating methods for use in software testing.

BACKGROUND

There are many different methods for testing software systems. For instance, there are manual methods for testing systems using generated transactional data derived from production data, however, such methods are difficult to use in testing "big data" systems.

SUMMARY

According to one aspect of the present invention, it is appreciated that there is a need to manage data used in regression testing for pre-production software processes. Existing regression testing methods typically require production data to be harvested, cleansed and re-located into a testing environment. This conventional process is flawed due to the several issues. First, full production-sized data sets are cumbersome to work with and are extremely time-consuming to move. Because data governance must be applied to all fields of the data set, the dataset generally requires a data cleansing step.

Also, it is appreciated that in traditional testing methods, no process exists to use and test relationally consistent subsets of the production data. Inconsistent subsets of data or full data sets are generally the only options for performing tests. Further, the extracted data must be kept for later steps in regression testing which is expensive and cumbersome to retrieve.

Also, there does not exist an ability to create a superset of data for testing future capacity needs. It is further appreciated that changes to the data generated by traditional methods are extremely difficult due to interdependencies within the data structures. For these and other reasons, improved methods for generating data for software testing purposes are needed.

According to one aspect, it is appreciated that it may be useful and particularly advantageous to provide a data generator that creates more realistic data for testing purposes, especially in data systems where large volumes of data are necessary. According to one embodiment, a data generator is provided that produces relationally consistent data for testing purposes. For instance, in one embodiment, a synthetic data generation process may be performed that produces any number of relationally consistent data table structures. Further, according to another embodiment, generation of the data can be statistically influenced so that the data generated can take on the "look and feel" of production data.

Further, according to another embodiment, a system is provided that is capable of controlling an amount of data generated, and supersets and subsets of relationally consistent data may be produced. According to one embodiment, data generation is performed by associating relationship algorithms to column sets. Thus, ability may be provided that allows data to be recreated at any time thus eliminating the need to archive sets of data for regression testing.

According to yet another embodiment, a capability is provided that allows a user to describe and generate sets of rationally consistent data using relationship algorithms. Such relationally consistent data may be generated in one or more data storage types (e.g., flat files) that are capable of being loaded into relational table structures.

Also, in another embodiment, a process is provided for parallel execution and management for the creation of the synthetic data, thus decreasing the amount of time used to generate such data. Further, according to another embodiment, an ability to influence the production of synthetic data by using statistical correlations is provided. Although synthetic data generation systems exist, current implementations do not include an ability to create data based on statistical relationships, an ability to generate large volume of data by exploiting a massive parallel work distribution mechanism, among others.

According to one aspect, a system for generating data is provided. The system comprises a data generator adapted having a plurality of components, including a column generator component adapted to build column-level data; a table generator component adapted to build table-level data including the column-level data; a component that determines an interdependency between the column-level and table-level data; and a scheduler that schedules generation of the column-level data and table-level data responsive to the determined interdependency between the column-level and table-level data.

In one embodiment, the data generator further comprises a control that permits a user to control a number of rows that are generated for the column-level data. In one embodiment, the data generator further comprises a component adapted to generate column-level data based on a column-to-column relationship. In one embodiment, the data generator further comprises a control that permits a user to control an order of the column-level data within the table-level data. In one embodiment, the scheduler that schedules generation of the column-level data and table-level data responsive to the determined interdependency between the column-level and table-level data is adapted to schedule parallel generation of data responsive to the determined interdependency. In one embodiment, the data generator is adapted to produce data that is relationally consistent.

In one embodiment, the data generator further comprises a plurality of data generator types comprising at least one of a group comprising a copy generator adapted to copy column-level data; a computational generator adapted to determine a mathematical operation between column data; and an expansion generator adapted to create multiple row output data based on input row data. In one embodiment, the data generator is adapted to generate an output data set responsive to control information that specifies a size of the output data set.

In one embodiment, the data generator is adapted to generate an output data set responsive to control information that specifies a statistical aspect of at least one portion of data within the output data set. In one embodiment, the data generator is adapted to generate an output data set responsive to control information that specifies uniqueness of at least one portion of the output data set in relation to other data portions of the output data set. In one embodiment, the statistical aspect of the at least one portion of data within the output data set includes a mathematical function performed on the at least one portion of data. In one embodiment, the statistical aspect of the at least one portion of data within the output data set includes a sequential function performed on the at least one portion of data. In one embodiment, the data generator is adapted to generate an output data set responsive to control information that loads predetermined values from a data input source.

In one embodiment, the data generator is adapted to generate an output data set responsive to control information that specifies an order of columns of the output data set. In one embodiment, the data generator further comprises a data generator type that is adapted to read a predefined set of values having a statistical relation to each other. In one embodiment, the data generator further comprises a data generator type that is adapted to create a row of data by multiplying column data by statistics elements. In one embodiment, the data generator further comprises a data generator type that is adapted to selectively duplicate data to expand an output data set.

According to one aspect, a method for generating data is provided. The method comprises acts of generating, by a plurality of column generator components, respective columns and associated column-level data; generating, by a table generator component, table-level data including the respective columns and associated column-level data; determining an interdependency between the column-level and table-level data; and scheduling a generation of the column-level data and table-level data responsive to the determined interdependency between the column-level and table-level data. In one embodiment, he method further comprises an act of permitting a user to control a number of rows that are generated for the column-level data. In one embodiment, the method further comprises an act of generating column-level data based on a column-to-column relationship.

In one embodiment, the method further comprises an act of permitting a user to control an order of the column-level data within the table-level data. In one embodiment, the act of scheduling further comprises an act of generating data in parallel responsive to the determined interdependency. In one embodiment, the method of generating data produces data that is relationally consistent. In one embodiment, data is generated using functions that perform at least one of a group of functions which comprises copying column-level data; determining a mathematical operation between column data; and creating multiple row output data based on input row data. In one embodiment, the method further comprises an act of generating an output data set responsive to control information that specifies a size of the output data set.

In one embodiment, the method further comprises an act of generating an output data set responsive to control information that specifies a statistical aspect of at least one portion of data within the output data set. In one embodiment, the method further comprises an act of generating an output data set responsive to control information that specifies uniqueness of at least one portion of the output data set in relation to other data portions of the output data set. In one embodiment, the statistical aspect of the at least one portion of data within the output data set includes a mathematical function performed on the at least one portion of data. In one embodiment, the statistical aspect of the at least one portion of data within the output data set includes a sequential function performed on the at least one portion of data. In one embodiment, the method further comprises an act of generating an output data set responsive to control information that loads predetermined values from a data input source.

In one embodiment, the method further comprises an act of generating an output data set responsive to control information that specifies an order of columns of the output data set. In one embodiment, the method further comprises an act of reading a predefined set of values having a statistical relation to each other. In one embodiment, the method further comprises an act of creating a row of data by multiplying column data by statistics elements. In one embodiment, the method further comprises an act of selectively duplicating data to expand an output data set.

In another aspect, a system for generating synthetic data for software testing, comprises at least one special-purpose computer for generating a process to build a set of column-level data; generating a process to build a set of table-level data; determining interdependencies between the column-level data and the table-level data; and creating a batch submission flow in response to the interdependencies.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
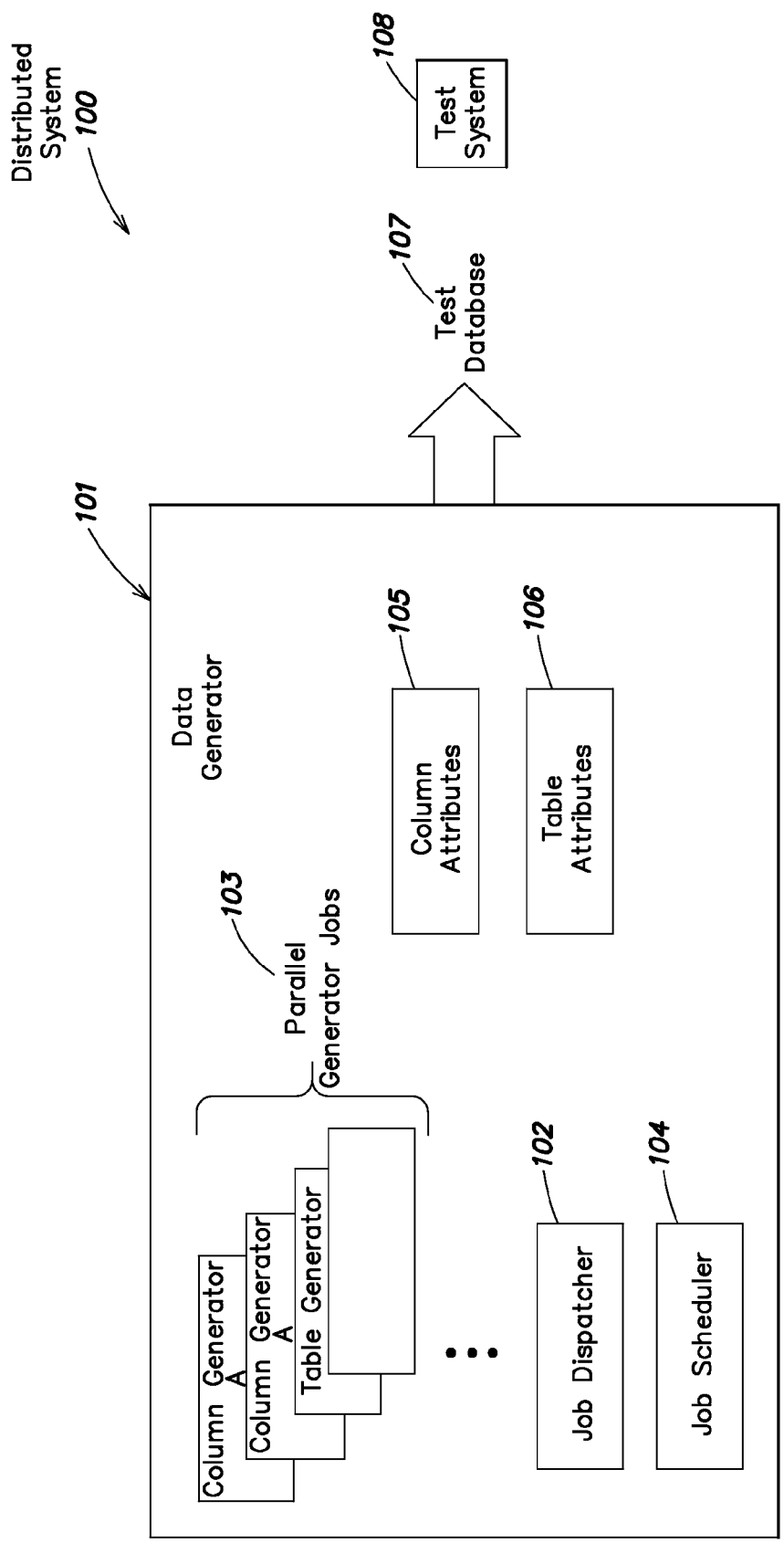
FIG. 1 is a block diagram showing a system for generating data according to various aspects of the present invention.

FIG. 1 shows a block diagram of a system 100 suitable for implementing various aspects of the present invention. In particular, according to one embodiment, FIG. 1 shows a distributed system 100 that includes one or more components that are capable of implementing various aspects of the present invention.

In particular, distributed system 100 may include a data generator 101 is capable of generating one or more test databases 107. Such test databases 107 may have any size and maybe capable of being loaded into one or more test systems (e.g., test system 108) for the purpose of testing one or more computer programs. For instance, a test system 108 may be provided that executes one or more production software programs, such as e-commerce, inventory management, or other types of system applications.

According to one embodiment, a data generator is provided such that a user may control the generation of data sets appropriate for being used for testing of such software applications. Data generator 101 may include one or more parallel generator jobs 103 which may include one or more generation processes that generate one or more aspects of a database. For instance, such jobs 103 may include one or more column generators, one or more table generators, or other jobs that generate an aspect related to an output database.

Further, data generator 101 may include a job dispatcher 102 which creates one or more jobs for creating table data. Table data and column data may be generated according to one or more column attributes 105 and table attributes 106. According to one aspect of the present invention, it is realized that the data generation process should be performed with the knowledge that some data needs to be generated prior to other data because of the interdependencies between particular aspects of the data. For this reason, a job scheduler 104 may be provided such that certain data generation jobs shall be executed in particular sequences (e.g., certain data is generated prior to the generation of other data) based on interdependencies between the data sets.

Figure 2:
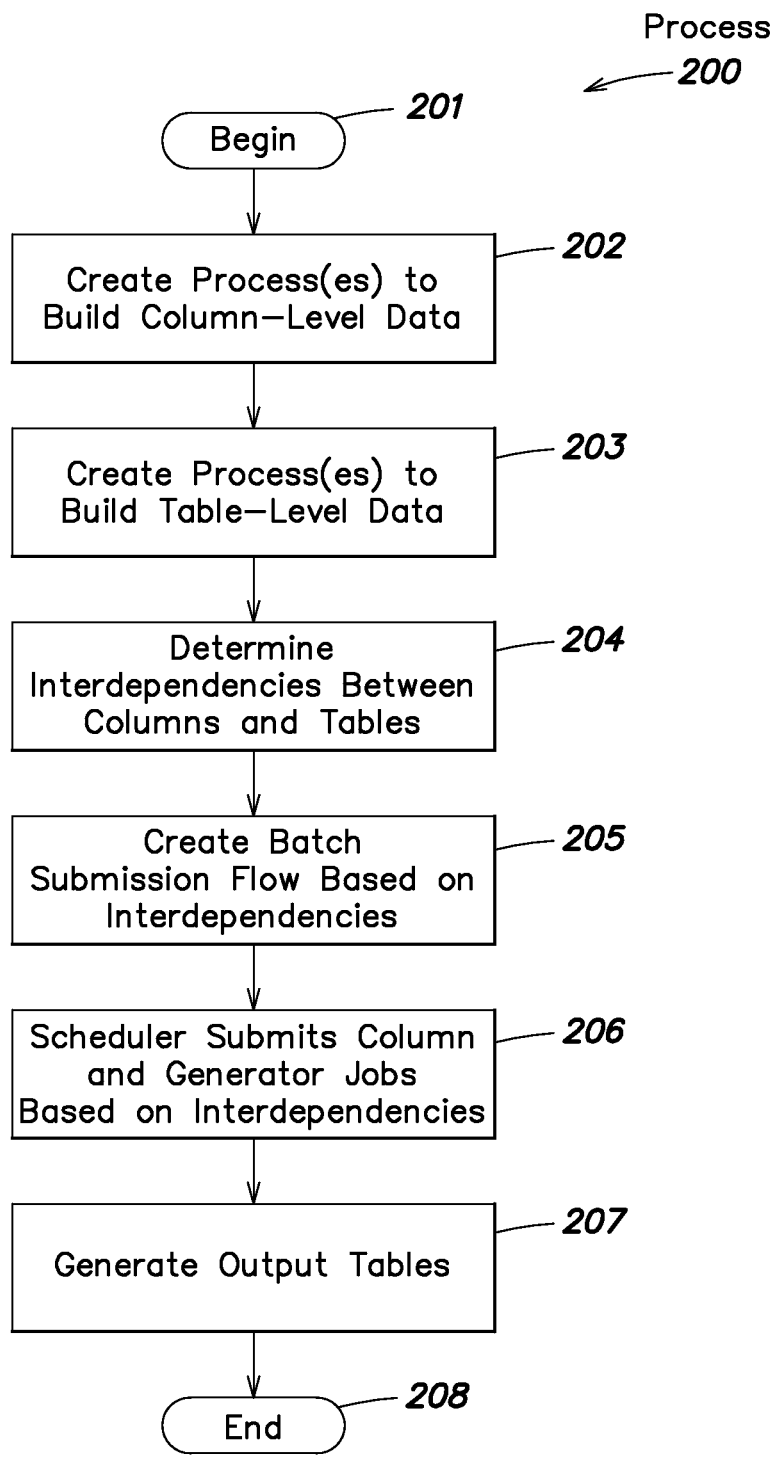
FIG. 2 shows an embodiment of a process for generating data according to various embodiments of the present invention.

FIG. 2 shows a process 200 for generating data according to one embodiment of the present invention. At block 201, process 200 begins. At block 202, the data generator (e.g., data generator 101) creates one or more processes to build column level data. After such column level data is built, the data generator creates one or more processes to build table level data at block 203. About 204, the data generator determines any interdependencies between column data and any associated tables.

At block 205, the generator creates a batch submission flow based on the determined interdependencies. A block 206, a scheduler of the data generator submits column and generator jobs based on the determined interdependencies. At block 207, output tables are generated, and at block 208, process 200 ends.

Figure 3:
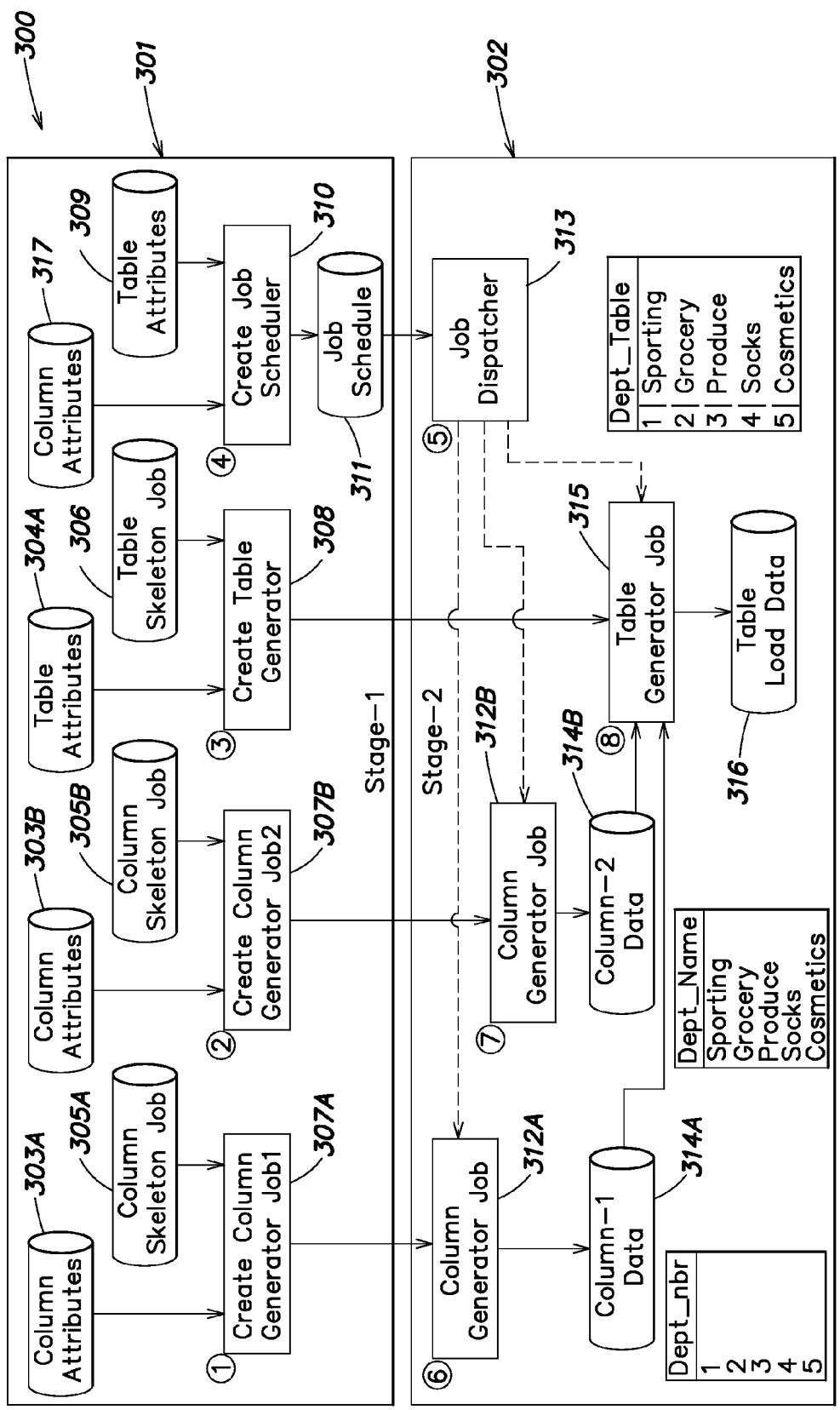
FIG. 3 shows another embodiment of a process for generating data according to various embodiments of the present invention.

FIG. 3 shows another embodiment of a process 300 for generating data according to various embodiments of the present invention. According to one embodiment, the process 300 may be managed in two stages. A first stage 301 builds jobs to create the data, and a second stage 302 executes the built jobs to create the data.

According to one embodiment, several processes occur within the first stage 301. In one implementation, column generator processes or "jobs" are used to create column-level data in a first major process. In one example, column generators are a set of callable services that create a column of data based on input parameters. Column generator jobs are created from a set of skeleton jobs. Skeleton jobs are template jobs that are used as a model to create an executable job by combining the skeleton jobs parameters derived from control files. According to one embodiment, column generator jobs are built before being submitted by the scheduler. Redefined column generator jobs may be divided into three categories:

| | |
|---|---|
| Copy Generators | Used to create columns using predetermined data |
| Computation Generators | Used to create columns based on math, such as summation |
| Expand Generators | Used to create one-to-many column relationships |

In a second major process, processes may be created to build table level data. In one implementation, table generator processes or "jobs" are used to create table-level data. In one example, table generator processes may be also built from skeleton jobs that are created using control parameters. The output may include an executable process that combines generated column data to create output table data. For instance, such an output may be in a table format that is capable of being loaded by a software program (e.g., flat files). It should be appreciated that other data formats may be used. In one embodiment, table generator jobs are created after the column jobs have been completed.

In a third major process, a job schedule is created. In one embodiment, the scheduler maps interdependencies between the columns and tables. The scheduler then creates a batch submission flow that most effective utilizes processing resources to generate the data. According to one embodiment, data may be generated in parallel depending on the interdependencies between column and table data. The scheduler will then begin submitting the generation jobs and manage the data generation workflow until all the jobs have been completed.

The second stage 302 includes scheduling and dispatching the generated jobs that create data. When the first stage processing is complete, control is automatically handed over to the scheduler. The scheduler then submits the column and table generation jobs based on the determined interdependencies between columns and tables. This process can be highly parallel, depending on the number and complexity of the interdependencies.

FIG. 3 shows an example process 300 for the generation of test data. According to one embodiment, the system may include one or more sets of column attributes (e.g. attributes 303A, 303B) that define characteristics of columns being generated. Depending on the number of columns, there may be one or more column skeleton jobs (e.g., skeleton jobs 305A, 305B). Column generator jobs (e.g., column generator jobs 307A, 307B) may be created by the data generator at process steps marked 1 and 2 based on skeleton jobs defined in a column attribute database (e.g., a column attribute file).

A table generator job process 308 may be created (e.g., at process step 3) using table attributes (e.g., table attributes 304A) based on a table skeleton job (e.g., table skeleton job 306). At process step 4, a job schedule 310 may be created using the column and table attributes (e.g., column attributes 317, table attributes 309). In one implementation, a job schedule is created which is used to manage the execution of the column and table build jobs.

At second stage 302, a job dispatcher process is started (e.g., at process step 5) and the job dispatcher submits any column generation jobs. For instance, column generator jobs 312A, 312B are started at process steps 6 and 7, respectively. When the column generation jobs complete (e.g., for a particular related table), the table generation job (e.g., job 315) is started (e.g., at process step 8). Column data for a first column (e.g., data 314A) is combined with column data for a second column (e.g., data 314B) to create a department table set of data.

Figure 4:
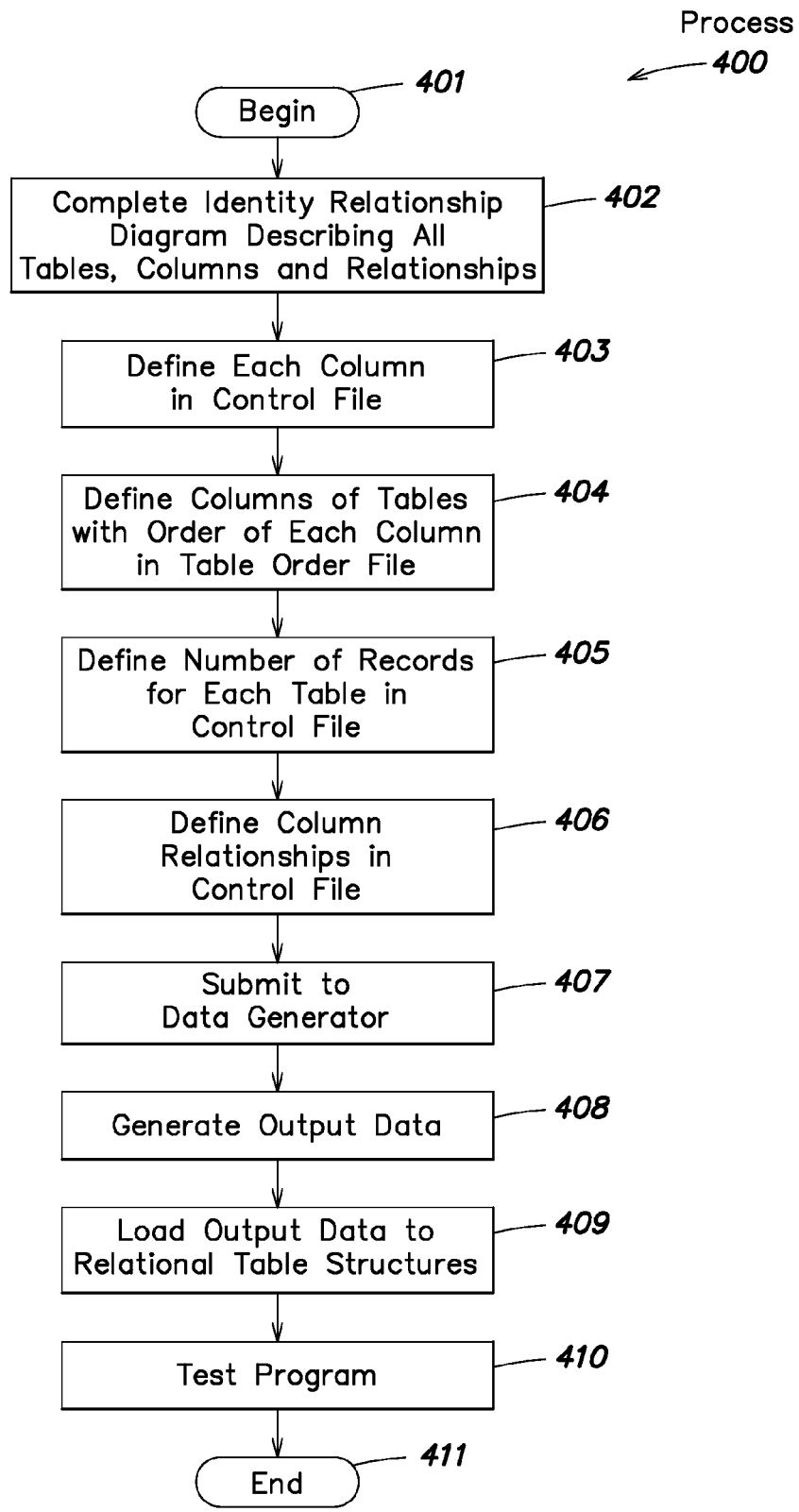
FIG. 4 shows another embodiment of a process for generating data according to various embodiments of the present invention.

FIG. 4 shows a more specific process 400 for the creation of synthetic data according to one embodiment of the present invention. In general, the generation of synthetic data may include a batch process that automatically spawns and manages parallel submission of worker jobs to create column and table data. According to one embodiment, the system may rely on control files and a set of column generation services that resolve relationship algorithms. The output may include a set of files where each file represents a table construct. The output files may be then used to load tables in a relational database management system.

In one implementation, data generation may be managed in sets. A set may include many databases, tables, and columns According to one specific implementation, all data within a set is managed together, and it may be ensured that data within the set is relationally consistent.

Elements referred to herein as "column generation services" as specified by relationship algorithms are predefined as part of the system and may be universal to all data generation sets. These services may be implemented as a set of skeleton jobs and called through a standardized interface. Because of this, new column generator skeleton jobs may be added as needed (e.g., by spawning a new process).

In one specific implementation, a set of three control files are used to define the generation set for data generation. These control files are referred to herein as a column attribute control file (ColAttr), a column relationship control file (ColRel), and a table order control file (TableOrder).

ColAttr (Column Attribute)

According to one embodiment, ColAttr or column attribute is a file that defines the attributes of columns to be generated. By default, a column may be defined once and that definition is used for all occurrences within the generation set. The following column attributes may be managed:

| | |
|---|---|
| DB | Usually "*" for all databases, can be used to signify column attributes by database |
| Column | Column name |
| Type | Column type cast (e.g., int, char, dec, date, time) |
| Uni | Y = column values are unique, N = column values do not need to be unique |
| Format | Output format for column (D = dec, C = Char, F = Float in format %<length><format>) |
| Low | For sequentially generated columns this parameter defines the starting value |
| High | For sequentially generated columns this parameter defines the ending value |
| Step | For sequentially generated columns this parameter defines the starting value |
| Gen | G = Gen numeric sequence, B = use predefined or predetermined values from a "bucket" file (e.g., sampled data, data determined as a result of some function or statistical variation, or some other method) |

Example:

```
#****************************************************
#DB      Column      Type  Uni  Format  Low  High  Step  Gen
#columns defined for dept
*        dept_nbr    int   y    %2d     01   99    1     G
*        dept_name   char  N    %10C    x    x     x     B
```

ColRel (Column Relationship)

According to one embodiment, Column relationship or ColRel is a file or other construct that defines the size of each table (e.g., by table row counts) being generated within the set. The following table attributes may be managed:

| | |
|---|---|
| Set | Name of the set of data being generated |
| DB | Database name of the table |
| Table | Table Name |
| rows | Number of rows to generate |
| <tblset> | Tags this as information for table row counts |

Example:

| #Set | DB | table | Rows | |
|---|---|---|---|---|
| exp2 | db1 | dept | 10 | tblset |
| exp2 | db1 | catg | 20 | tblset |

Generally all tblset definitions may be placed at the top of the ColRel file. Further, a control file format may be provided that defines the relationships between two or more columns (e.g., as expressed by relationship algorithms between two or more columns) The control file may have the following attributes:

| | |
|---|---|
| Set | Name of the set of data being generated |
| DB1 | Database name for the column to generate |
| Table1 | Table name for the column to generate |
| Col1 | Column to generate (db1.table1.column1) |
| DB2 | Database name of the related column |
| Table2 | Database name of the related column |
| Col2 | Database name of the related column (db2.table2.column2) |
| Relation | Describes the column to column relationship (column generator job) |
| Parm | Optional parameters used in describing the relationship |

Example:

| #Set Parm | DB1 | Table1 | Col1 | DB2 | Table2 | Col2 | Relation | |
|---|---|---|---|---|---|---|---|---|
| exp2 04:10 | db1 | subcatg | catg_nbr | db1 | catg | catg_nbr | ExpColSta | |
| exp2 04:10 | db1 | subcatg | subc_nbr | x | x | x | CpySeqSta | |
| exp2 | db1 | subcatg | subc_desc | x | x | x | CpyBuc | x |

TableOrder (Table Order)

According to one embodiment, Table Order or TableOrder is a control file that defines the attributes of tables, and more specifically describes the column order for a database table. The control file may have the following attributes:

| | |
|---|---|
| Database | Database name for the table |
| Table | Table Name |
| Column | Column name |
| Set | Name of the set of data being generated |
| Seq | Order of the column starting from the left |

Example:

| #Database | Table | Column | Set | Seq |
|---|---|---|---|---|
| db1 | dept | dept_nbr | exp2 | 1 |
| db1 | dept | dept_name | exp2 | 2 |

FIG. 4 shows another embodiment of a process 400 for generating data according to various embodiments of the present invention. At block 401, process 400 begins. At block 402, the data generator completes an entity relationship diagram describing all tables, columns and relationships between them. According to one aspect, it is appreciated that the interrelationships between columns and tables need to be determined to determine an optimal generation process. That is, for column data or any other type having no relationship, data may be generated using parallel processes.

At block 403, the data generator defines each column in a control file (e.g., the column attribute control file discussed above). For instance, attributes related to how a particular column will be generated may be delineated within such a control file. A block 404, the system defines columns of tables with the order of each column in a table order file. A block 405, the system defines a number of records for each table within the control file (e.g., the column relationship control file).

At block 406, the system defines column relationships in the control file (e.g., the column relationship control file). At block 407, the information is submitted to the data generator. At block 408, the data generator creates output data. At block 409, output data is loaded to relational table structures. At block 410, the software under test may be tested using the data generated by the data generator. A block 411, process 400 ends.

As discussed, data may be generated by creating relationships between columns A relationship corresponds to a process called a column generator that will create the column data. The column generator name may be referenced in the control file "ColRel" under the heading "relation."

According to one implementation, there may be three general generator categories:

Copy Generators—Used to Initially Create or Copy Column Data

| | |
|---|---|
| CpyCol | Duplicates another column that has already been generated |
| CpyBuc | Generate rows based on a predefined series of values known as a "bucket file" |
| CpySeq | Generates sequential numeric rows |
| CpySta | Generate rows by reading a predefined set of values from a specified statistics file |
| CpyPar | Create rows by adding a prefix of another column to a sequentially generated set of numbers |
| CpySeqSta | Generate sequentially numbered sets of rows. Each set count may be read from a statistics file |

Computation Generators—Used to Provide Mathematical Relationships Between Columns

| | |
|---|---|
| CmpCnt | Counts the number of input rows that are the same. Outputs the count every time the input column changes |
| CmpSum | Create an output row by adding the values of two input rows |
| CmpMulSta | Create an output row by multiplying the input columns by a set of values from a statistics file |
| CmpMulSet | Create an output row by multiplying columns from the same rows until a control column value changes |
| CmpSumSet | Create an output that is the sum of a set of input rows |
| CmpDivSta | Create an output row by multiplying the input columns by a set of values from a statistics file |

Expand Generators—Used to Create One-to-Many Relationships

| | |
|---|---|
| ExpCol | Create multiple output rows of the same value as the input row |
| ExpColBuc | Create multiple output rows of the same value as the input row, and restarts the input read at a given interval |
| ExpColSeq | Create multiple output rows of the same value as the input row, and restarts the input read at a given interval |
| ExpColSta | Create multiple output rows of the same value as the input row |

Figure 5A:
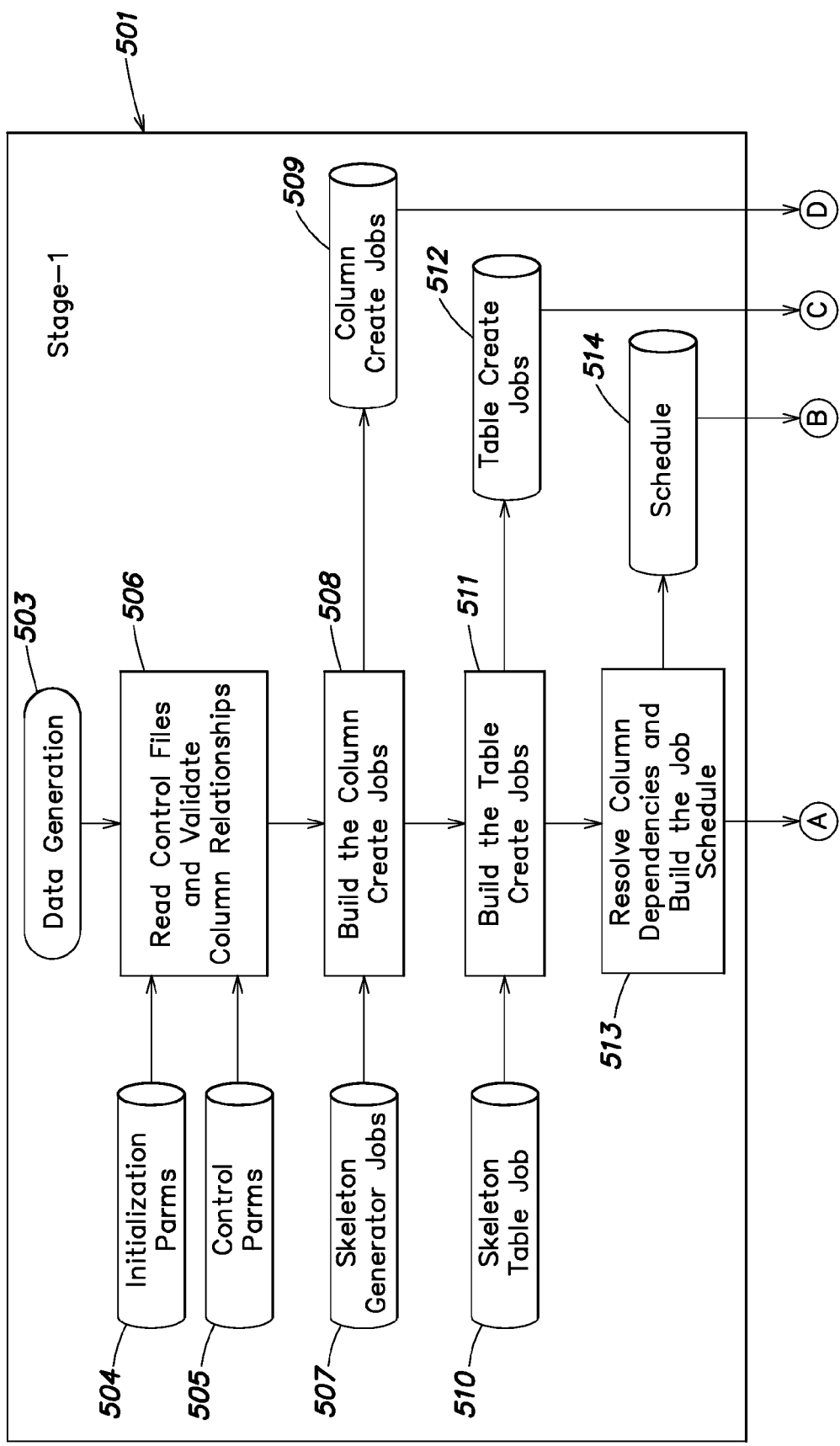
FIGS. 5A-5B shows another process for generating data according to various embodiments of the present invention.
Figure 5B:
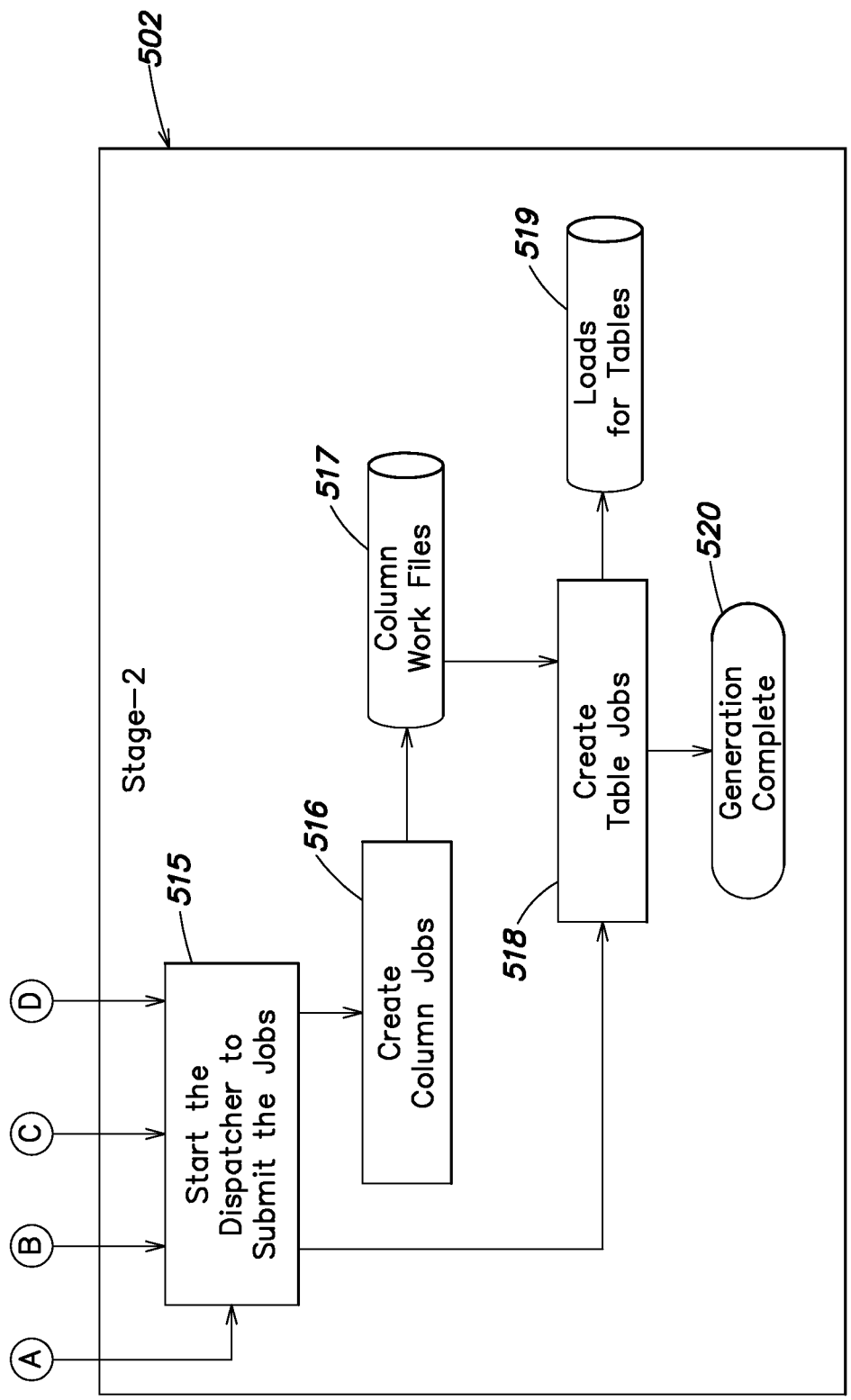

FIGS. 5A-5B show an example process for generating data according to various embodiments of the present invention. Within a first stage 501, a data generation is initiated at block 503. At block 506, the system (e.g., the data generator) reads control files as discussed and validates column relationships. Process 506 may include processing initialization parameters (e.g., initialization parameters 504) as well as control parameters (e.g., control parameters 505). Initialization parameters may include, for example, the names of the databases, tables, columns, data types and other characteristics of the data model being built. Control parameters may include the number of columns, size of the database, among other parameters that control the generation of data.

At block 508, skeleton generator jobs (e.g., jobs 507) are used as templates to build column create jobs (e.g., column create jobs 509). At block 511, skeleton table jobs (e.g., job 510) is used to build table create jobs (e.g., table create jobs 512). At block 513, the data generator resolves column dependencies and builds a job schedule (e.g., schedule 514).

At block 515, the generator starts the dispatcher to submit the created jobs based on the created schedule. At block 516, column jobs are created, and column work files (e.g., files 517) are produced as a result. At block 518, table jobs are created and based on inputted column work files (e.g., files 517), data loads are produced for tables (e.g., loads 519). As discussed above, data may be produced in a format that can be loaded into a database table which can be tested. At block 520, generation is completed.

Example Implementation

Figure 6:
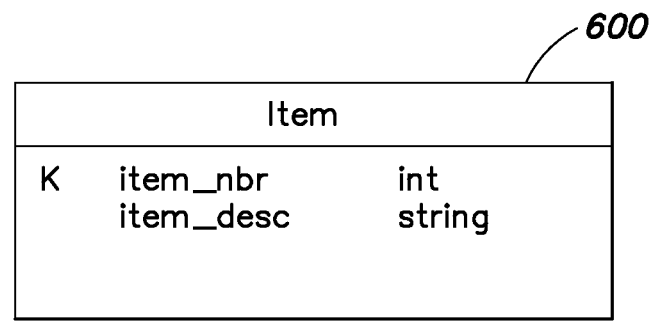
FIG. 6 shows an example data structure that may be used is an example data generation process according to various embodiments of the present invention.

In one example, it is desired to create a 10-row table with two columns, including item numbers and descriptions. An example data format 600 is shown by way of example in FIG. 6. In the example, the first column for the item number (item_nbr) is sequentially numbered beginning at 1 and is incremented by 1. The second column for the item description (item_desc) is a character description of the item.

The database has the following information:

| set name | test | |
|---|---|---|
| database name | db1 | |
| table name | item | |
| column names | item_nbr | key, unique, numeric |
| | item_desc | non-unique, string |

In this example, three control files need to be created.
The control files are named as <set>_<type>
<Set> is the name of process for generating the data. In this example the set name is "test"
<Type> is the name of the control file which is one of "ColAttr", "ColRel", or "TableOrder"

Step-1:
Define the attributes of the columns in the /cntl/test_ColAttr file. In this example the column names are item_nbr, and item_desc.
Item_nbr:
  Integer
  Each row will be unique
  Format is % 9D (leading spaces)
  First row will be 1 and each new row will increment by 1
  The data will be generated (Gen=G)
Item_Desc:
  20 characters
  Does not need to be unique
  Generation may be performed from a bucket file (Gen=B)
Create the File /cntl/test_ColAttr:

Step-2:

Define the column order for the table in the /cntl/test_TableOrder file.

Create the file /cntl/test_TableOrder:

| #Database | Table | Column | Set | Seq |
|---|---|---|---|---|
| # ************************************************ | | | | |
| db1 | item | item_nbr | test | 1 |
| db1 | item | item_desc | test | 2 |

Step-3:

Define how the table and columns will be generated in the /cntl/test_ColRel file. First define the total number of columns contained in the table. In this example, 10 rows will be generated for the table item.

Create the File /cntl/test_ColRel:

| #set DB | Table | columns | |
|---|---|---|---|
| test db1 | item | 10 | tblset |
| # | | | |

Next define how the column data will be generated. This example uses the column generator name "CpySeq" to build the column item_nbr for the table item. "CpySeq" invokes the CpySeq generator which creates a series of sequential numbers based on the parameters from the ColAttr control file (discussed above). The Column item_desc is created using the column generator "CpyBuc" which copies a pre-defined set of information into the column file.

Add the following after the table column count information in /cntl/test_ColRel:

```
# ColAttr
#   DB      (Optional) Database name if column is different across databases
#   Column  Column name
#   Type    Column type (int, char, dec, date, time)
#   Uni     Do the column rows need to be unique? (Y/N)
#   Format  Output format for column (D=dec, C=Char, F=Float)
#   Low     For numeric data, low gen value
#   High    For numeric data, high gen value
#   Step    For numeric data, step between values
#   Gen     Gen numeric sequence (G) for use pre-defined values (B)
#*****************************************************
```

| #DB | Column | Type | Uni | Format | Low | High | Step | Gen |
|---|---|---|---|---|---|---|---|---|
| * | item_nbr | int | Y | %9D | 00000000 | 99999999 | 1 | G |
| * | item_desc | char | N | %20C | x | x | x | B |

```
#*************************************************************************
#Set   DB1   Table1   Col1       DB2   Table2   Col2   Relation   Parm
#-------------------------------------------------------------------------
test   db1   item     item_nbr   x     x        x      CpySeq     x
test   db1   item     item_desc  x     x        x      CpyBuc     x

#*************************************************************************
```

Step-4: Run the generation process:

```
/datagen $ DG test
Genning codebase for DataGen
Building DG_Main
DBbuild complete
DGmain (1.1B) starting for set:test
Job Schedule for set:test
Job      Status   Database   Table   Column      Queue
-------------------------------------------------------
test:1   Queued   db1        item    item_nbr    none
test:2   Queued   db1        item    item_desc   none
```

-continued

```
Job         Status      Database   Table   Column      Queue
-------------------------------------------------------------
testtjob1   Queued      db1        item
Job         Status      Database   Table   Column      Queue
test:1      Submitted   db1        item    item_nbr    none
test:2      Submitted   db1        item    item_desc   none
testtjob1   Queued      db1        item
Job         Status      Database   Table   Column      Queue
testtjob1   Submitted   db1        item
Job         Status      Database   Table   Column      Queue
Execution complete for datagen set:test
```

The output file may be placed in /output/

```
/datagen/output $ cat test_db1-item
        0|DC- DICE IPOD KIT        |
        1|DC- ZUNE CAR PK          |
        2|PR CHICHI PERALTA (R     |
        3|DRAGTOHELL2PK WS         |
        4|SONY 16GB MP3 PLAYER     |
        5|PR LOS ANDINOS           |
        6|LASSIE WS                |
        7|SM LASTKINGOF FF         |
        8|PR KARAOKE SYSTEM        |
        9|VIZ VO370M               |
/log/logtest
130513:140605  Init
130513:140605  DGmain (1.1B) starting for set:test
130513:140605  Building ColRel
130513:140605  TableSet
130513:140605  |db1|item|10
130513:140605
130513:140605  |db1|item|item_nbr|1
130513:140605    |x|x|x|CpySeq|x|
130513:140605  |db1|item|item_desc|2
130513:140605    |x|x|x|CpyBuc|x|
130513:140605
130513:140605  Building TableOrder for set test
130513:140605  |db1|item|item_nbr|1|
130513:140605  |db1|item|item_desc|2|
130513:140605
130513:140605  Building ColAttr for set test
130513:140605  |db1|item_nbr|int|Y|%9D|00000000|99999999|1|G|
130513:140605  |db1|item_desc|char|N|%20C|x|x|x|B|
130513:140605
130513:140605  Building column generation job sequence
130513:140605  checking:1 table:item col:item_nbr
130513:140605  checking:2 table:item col:item_desc
130513:140605
130513:140605  Job schedule:
130513:140605  1|db1|item|item_nbr|No Dependency
130513:140605  2|db1|item|item_desc|No Dependency
130513:140605
130513:140605  Building column generation sequence
130513:140605  Build DB:db1 tbl:item col:item_nbr
130513:140605     Output|test:db1-item-item_nbr
130513:140605     Base gen count is 10 rows
130513:140605  Building table Job:test:1
130513:140605     Job Gen:DG_Skelt_CpySeq
130513:140605     Temp column table built
130513:140605  Build DB:db1 tbl:item col:item_desc
130513:140605     Output|test:db1-item-item_desc
130513:140605     Base gen count is 10 rows
130513:140605  Building table Job:test:2
130513:140605     Job Gen:DG_Skelt_CpyBuc
130513:140605     Temp column table built
130513:140605
```

-continued

```
130513:140605  Setting up table build processing
130513:140605     Table| file|test_db1-item
130513:140605        Col|item_nbr Input|test:db1-item-item_nbr
130513:140605        Col|item_desc Input|test:db1-item-item_desc
130513:140606  Building table Job:testtjob1
130513:140606  Job Schedule for set:test
130513:140606  Job          Status    Database  Table   Column     Queue
130513:140606  ---------------------------------------------------------
130513:140606  test:1       Queued    db1       item    item_nbr   none
130513:140606  test:2       Queued    db1       item    item_desc  none
               Job          Status    Database  Table
130513:140606  ---------------------------------------------------------
130513:140606  testtjob1    Queued    db1       item
130513:140606
130513:140606  Submitting and tracking build jobs
130513:140606     Submitting column built job:test:1
130513:140606     Submitting column built job:test:2
130513:140606  sleeping:0 of 2 and 0 of 1
130513:140614  Submitting table job:testtjob1
130513:140614  sleeping:2 of 2 and 0 of 1
130513:140622  sleeping:2 of 2 and 1 of 1
130513:140630  All Column jobs completed
130513:140630  start:Mon May 13 14:06:05 CDT 2013
130513:140630     end:Mon May 13 14:06:30 CDT 2013
130513:140630  execution:00:00:25
Work files may be placed in /work/
     test:db1-item-item_desc
     test:db1-item-item_nbr
Log files may be placed in /log/
logtest
logtest:1
logtest:2
logtesttjob1
schdtest
/log $ cat logtest:1
130513:140606  Init
130513:140606  column build starting
130513:140606     output column file:test:db1-item-item_nbr
130513:140606     Generating rows:10
130513:140606        start:Mon May 13 14:06:06 CDT 2013
130513:140606           end:Mon May 13 14:06:06 CDT 2013
130513:140606  execution:00:00:00
130513:140606  Job ending normally
/log $ cat logtest:2
130513:140606  Init
130513:140606  column build starting
130513:140606     output column file:test:db1-item-item_desc
130513:140606     Generating rows:10
130513:140606        Opening bucket: item_desc
130513:140606        start:Mon May 13 14:06:06 CDT 2013
130513:140606           end:Mon May 13 14:06:06 CDT 2013
130513:140606  execution:00:00:00
130513:140606  Job ending normally
/log $ cat logtesttjob1
130513:140614  Init
130513:140614  table1:   Table build starting
130513:140614  table1:   Output|test_db1-item
130513:140614  table1:   Colfile col1:test:db1-item-item_nbr
130513:140614  table1:   Colfile col2:test:db1-item-item_desc
130513:140614  table1:   Creating 10 rows
130513:140614  table1:   Table Build Complete
130513:140614     start:Mon May 13 14:06:14 CDT 2013
130513:140614        end:Mon May 13 14:06:14 CDT 2013
130513:140614  execution:00:00:00
130513:140614  Job ending normally
```

Example Case Study: Generation of Point of Sale (POS) Data

Figure 7A:
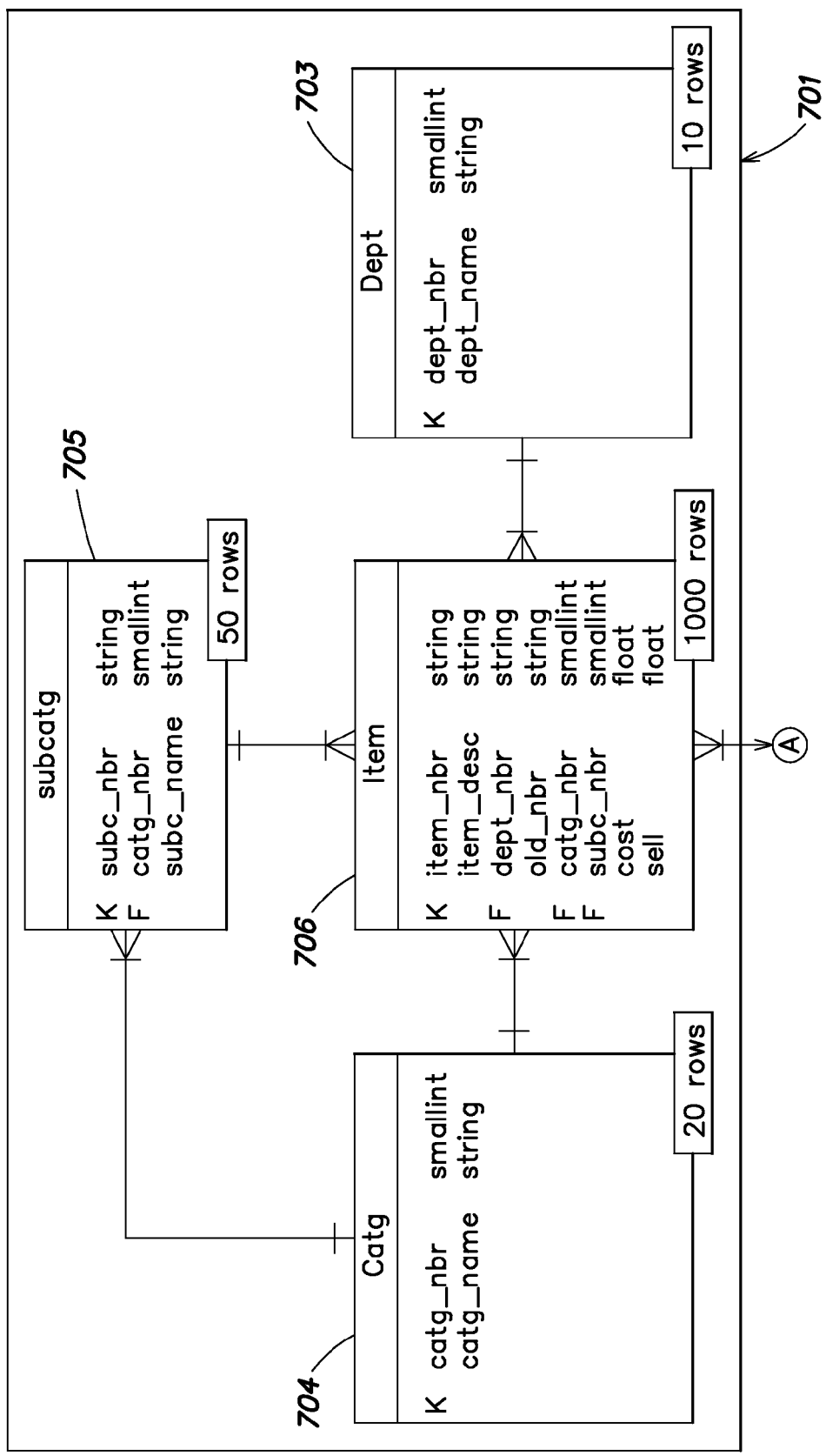
FIGS. 7A-7B shows an example data structure that may be generated using various embodiments of the present invention.
Figure 7B:
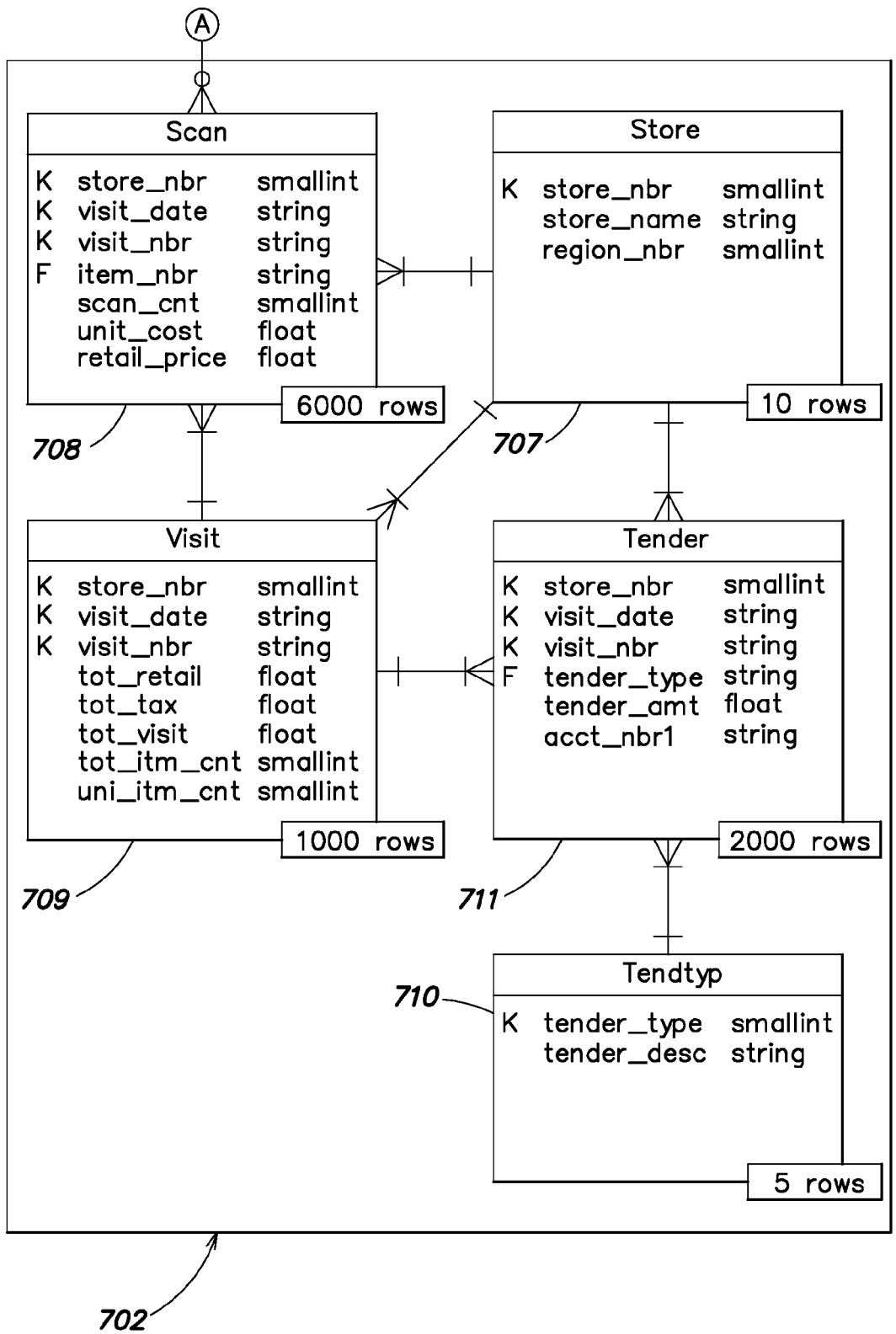

FIGS. 7A-7B show an example entity relationship diagram (ERD) of POS data (e.g., such as information that might be tracked at one or more retail store locations for a large retail establishment). The example shown in FIGS. 7A-7B outlines the tables, columns and relationships that may be needed to perform a valid regression test for a particular retail establishment.

For instance, the data model used for the generation of data may include a number of tables 701 that describe item data and the interrelationships between related tables. For instance, an item table (706) may include information describing all of the items of a retail establishment, which can be further linked to particular category (704) and subcategory (705) tables. Further, such an item may be linked to a department table (e.g., table 703). Item data may also relate to other table types such as those that relate to transactions using those items.

For instance, as shown in table group 702, there may include a scan table which includes detailed information regarding items purchased in a "visit" or summary of a customer at a checkout instance, which can be stored in a separate visit table 709. A store table 707 may list information relating to each of the retail stores being generated. A tender table 711 may store payment details related to a visit by a particular customer, and a tender type table 711 may store all of the valid tender types that may be used for payment. Each of these rows may have varying amounts of data, and may include data which is interrelated to data within another column Materialization of the data output can be divided in two steps;

1) Tables that describes item which include department, category, and sub-category tables.

| | |
|---|---|
| Dept | Item department number |
| Catg | Item grouping |
| Subcatg | Item sub-grouping |
| Item | Item information |

2) Tables describing item sales, including tables for stores, tenders, and tender types:

| | |
|---|---|
| Store | List of stores in company |
| Scan | Detail of items purchased by visit |
| Visit | Summary of a customer at checkout |
| Tendtyp | Valid types of payments |
| Tender | Detail of payment by visit |

The Item table describes items that the company intends to sell. When an item is sold, the sales transaction is recorded in the Scan, Visit, and Tender tables. The Scan table records each item sold. The Visit table groups the items sold to one person at one time of purchase (referred to as a visit). The Tender table records how the customer paid for the items.

Step-1:
Create the Dept, Catg, SubCatg and Item tables
Item has three foreign keys: dept_nbr, catg_nbr, and subc_nbr. These columns must be resolved before the item table can be generated. The generation process may be defined in the following sequence:
1. Generate the Dept table load file. This table will only need to generated with a dept_nbr and Dept_name.
2. Generate the Catg table load file
3. Generate the subcatg table load file.
4. Generate the Item table load file.

Create /cntl/exp1_ColAttr:

```
# ColAttr
#    Column   Column name
#    Type     Column type (int, char, dec, date, time)
#    Format   Output format for column (D=dec, C=Char, F=Float)
#    Low      For numeric data, low gen value
#    High     For numberic data, high gen value
#    Step     For numeric data, step between values
#    Gen      Gen numeric sequence (G) for use pre-defined values (B)
#***********************************************
#DB         Column      Type  Uni  Format   Low        High        Step  Gen
#columns defined for dept
*           dept_nbr    int   y    %2d      01         99          1     G
*           dept_name   char  N    %10C     x          x           x     B
#columns defined for catg
*           catg_nbr    int   y    %4D      1          9999        1     G
*           catg_desc   char  n    %32C     x          x           x     B

#columns defined for subcatg
*           subc_nbr    int   y    %2d      1          99          1     G
*           subc_desc   char  n    %32D     x          x           x     B

#Columns defined for item
*           item_nbr    int   Y    %9D      00000001   99999999    1     G
*           item_desc   char  N    %20C     x          x           x     B
*           old_nbr     int   Y    %07D     1          99999       1     G
*           cost        dec   N    %7.2F    .1         300.00      .12   G
*           sell        dec   N    %7.2F    .15        480.00      .13   B

#***end
```

Create /cntl/exp1_TableOrder:

```
# TableOrder custom table for exp1
#    DB      - database name
#    Table   -Table name
#    Column  - Column name
#    Set     - Generated set name
#    Seq     - Order of column in table
#*****************************************************
#Database   Table       Column       Set       Seq
#*****************************************************
db1         dept        dept_nbr     exp1      1
db1         dept        dept_name    exp1      2

db1         catg        catg_nbr     exp1      1
db1         catg        catg_desc    exp1      2

db1         subcatg     catg_nbr     exp1      1
db1         subcatg     subc_nbr     exp1      2
db1         subcatg     subc_desc    exp1      3

db1         item        item_nbr     exp1      1
db1         item        item_desc    exp1      2
db1         item        dept_nbr     exp1      3
db1         item        old_nbr      exp1      4
db1         item        catg_nbr     exp1      5
db1         item        subc_nbr     exp1      6
db1         item        cost         exp1      7
db1         item        sell         exp1      8

#*****************************************************
db1         repeat      0            exp1
#*****************************************************
```

Create /cntl/exp1_ColRel:

```
# ColRel custom table for exp1
#************************************************************************
# Define the table row counts
exp1    db1    dept              10    tblset
exp1    db1    catg              20    tblset
exp1    db1    subcatg           50    tblset
exp1    db1    item            1000    tblset

# Define the column attributes
#Set    DB1    Table1    Col1          DB2    Table2    Col2       Relation      Parm
#------------------------------------------------------------------------
# sequential create 10 department numbers
exp1    db1    dept      dept_nbr      x      x         x          CpySeq                    x
# copy dept names from /bucket/dept_name into the column dept_name
exp1    db1    dept      dept_name     x      x         x          CpyBuc                    x

# sequential create 20 category numbers
exp1    db1    catg      catg_nbr      x      x         x          CpySeq                    x
# copy category descriptions from /bucket/catg_desc into the column catg_desc
exp1    db1    catg      catg_desc     x      x         x          CpyBuc                    x

# Create 50 sub_catg numbers using the category numbers generated in catg
# This is a 1-to-many relationship.
# every 4 rows read will be expanded to 10 rows
exp1    db1    subcatg   catg_nbr      db1    catg      catg_nbr   ExpColSta     04:10
#create a set of sequential number. The number will begin again at 1 every
#time the catg_nbr changes
exp1    db1    subcatg   subc_nbr      x      x         x          CpySeqSta     04:10
# copy sub-category descriptions from /bucket/subc_desc into the column subc_desc
exp1    db1    subcatg   subc_desc     x      x         x          CpyBuc                    x

# sequential create 1000 item numbers
exp1    db1    item      item_nbr      x      x         x          CpySeq                    x
# copy name from /bucket/item_desc into the column item_desc
exp1    db1    item      item_desc     x      x         x          CpyBuc                    x
# duplicate dept.dept_nbr to item.dept_nbr
exp1    db1    item      dept_nbr      db1    dept      dept_nbr   CpyCol                    x
# Old_nbr is comprised by appending the first 2 characters of dept_nbr
# to the front of a sequentially generated number
exp1    db1    item      old_nbr       db1    item      dept_nbr   CpyPar        0.2
# copy the category numbers
exp1    db1    item      catg_nbr      db1    subcatg   catg_nbr   CpyCol                    x
# copy the sub-category numbers
exp1    db1    item      subc_nbr      db1    subcatg   subc_nbr   CpyCol                    x
# copy a preset of cost values from /bucket/cost
exp1    db1    item      cost          x      x         x          CpyBuc                    x
# create the seel price by multipling cost by the values in
# /bucket/DG_stat_01:09
exp1    db1    item      sell          db1    item      cost       CmpMulSta     01:09
#************************************************************************
```

Execution of the Data Generator:
/DG exp1
　　The following table load files are created in /output/

```
/output/exp1_db1-dept
 1|Sporting    |
 2|Grocery     |
 3|Produce     |
 4|Socks       |
 5|Cosmetics   |
 6|Car stuff   |
 7|Joke books  |
 8|Cars        |
 9|Money       |
10|Sporting    |
/output/ exp1_db1-catg
    1|1016 STATIONERY           |
    2|18 PK WASHCLOTHS          |
    3|ABRASIVES                 |
    4|ACC. ACUARIO              |
    5|ACC. PERROS               |
    6|ACCENT FURNITURE          |
    7|ACCESSORIES               |
    8|ACTIVE BAGS               |
```

-continued

```
    9|ACTIVE BOTTOMS             |
   10|ACTIVE NUTRITION           |
   11|ACTIVE SHORTS              |
   12|ACTIVE TOPS                |
   13|ACTIVEWEAR                 |
   14|ACTIVITY TOYS              |
   15|ADDITIVES                  |
   16|ADULT NUTRITION            |
   17|AIR CONDITIONER RECHARGE   |
   18|AIR CONDITIONERS           |
   19|AIR FILTERS                |
   20|AIR FRESHENER AND DEODORIZER |
/output/ exp1_db1-subcatg
   1|  1|2 Pk Seamless Bras              |
   1|  2|Avg Boxed Soft Cup Bras         |
   1|  3|Avg Boxed Underwire Bras        |
   2|  1|Best - Beautyrest    Springmaid |
   2|  2|Board Shorts                    |
   3|  1|Case Ready Pork                 |
   3|  2|Contour Seamless Bras           |
   3|  3|CONVENIENCE MEALS               |
   3|  4|DSD Pork Offals                 |
   4|  1|Freezer Bars                    |
. . . . .
/output/ exp1_db1-item
       1|DC- DICE IPOD KIT      |  1|0100001|  1|  1|   29.96|   41.94|
       2|DC- ZUNE CAR PK        |  2|0200002|  1|  2|    3.00|    4.80|
       3|PR CHICHI PERALTA (R   |  3|0300003|  1|  3|    1.91|    2.20|
       4|DRAGTOHELL2PK WS       |  4|0400004|  2|  1|    5.00|    6.60|
       5|SONY 16GB MP3 PLAYER   |  5|0500005|  2|  2|   13.94|   16.73|
       6|PR LOS ANDINOS         |  6|0600006|  3|  1|    2.29|    2.52|
       7|LASSIE WS              |  7|0700007|  3|  2|   28.00|   43.12|
       8|SM LASTKINGOF FF       |  8|0800008|  3|  3|    8.87|    6.39|
       9|PR KARAOKE SYSTEM      |  9|0900009|  3|  4|    2.08|    2.45|
      10|VIZ VO370M             | 10|1000010|  4|  1|    9.46|   13.24|
      11|GOLDFNGR BD BD         |  1|0100011|  5|  1|    3.46|    5.54|
      12|WII MOTIONPLUS         |  2|0200012|  5|  2|   29.97|   34.47|
      13|JNCONFUSNPROM FF       |  3|0300013|  5|  3|    5.98|    7.89|
      14|SANYO 19" LCDHDTV      |  4|0400014|  6|  1|    5.44|    6.53|
      15|WORLD FASTEST INDIAN   |  5|0500015|  6|  2|    4.96|    5.46|
      16|PDVD ACC PACK          |  6|0600016|  7|  1|    1.35|    2.08|
      17|TESTING ITEM           |  7|0700017|  7|  2|   18.83|   13.56|
      18|LEGO 4 PACK            |  8|0800018|  7|  3|    4.96|    5.85|
      19|CURB YOUR ENTH SSN 4   |  9|0900019|  7|  4|    6.96|    9.74|
      20|PR FELIPE RODRIGUEZ    | 10|1000020|  8|  1|    8.96|   14.34|
. . . . .
```

Step-2: create the Store, Visit, Scan, and Tender table load files

The second part of the use case is to generate visit information (transaction sales).

The following tables need to be defined:

| | |
|---|---|
| Store | List of stores in company |
| Visit | Summary of a customer at checkout |
| Scan | Detail of items purchased by visit |
| Tender | Detail of payment by visit |
| Tendtyp | Valid types of payments |

Notes for the example:
Data is generated for 1 day
Data includes 10 stores
Each store has 100 visits
There is an average of 6 items per visit
There is an average of 2 payments types per visit The Visit table contains a summary of information concerning the scans.

| | |
|---|---|
| Tot_retail | sum of retail_price * scan_cnt for all scan item in this visit |
| Tot_tax | (statistical tax amount) * tot_retail in this visit |
| Tot_visit | tot_retail + tot_tax in this visit |
| Tot_itm_cnt | number of scan items in this visit |
| Uni_itm_cnt | sum of scan_cnt for all scan item in this visit |

For this example, set exp1 is copied into set exp2 and the following parameters are appended to the control files.

Update /cntl/exp2_ColAttr

```

#Columns  defined for store
*         store_nbr    int   Y    %4d    100    9999    1    G
*         region_nbr   int   N    %2d      1       5    1    G

```

-continued

| #Columns | defined for scan | | | | | | | |
|---|---|---|---|---|---|---|---|---|
| * | visit_date | char | N | %8C | x | x | x | B |
| * | visit_nbr | int | Y | %6d | 100000 | 999999 | 1 | G |
| * | scan_cnt | int | N | %3d | 1 | 20 | 1 | B |
| * | retail_price | dec | N | %7.2F | .15 | 300 | .13 | G |
| * | unit_cost | dec | N | %7.2F | .1 | 250 | .12 | G |
| # | | | | | | | | |
| #Columns | defined for visit | | | | | | | |
| * | tot_retail | dec | N | %9.2F | .4 | 300 | .12 | G |
| * | tot_visit | dec | N | %9.2F | .4 | 300 | .12 | G |
| * | tot_cost | dec | N | %9.2F | .4 | 300 | .12 | G |
| * | tot_itm_cnt | int | N | %3d | 1 | 20 | 1 | G |
| * | uni_itm_cnt | int | N | %3d | 1 | 20 | 1 | G |
| * | tot_tax | dec | N | %7.2F | 0 | 9999999 | 1 | G |
| # | | | | | | | | |
| #Columns | defined for tender | | | | | | | |
| * | tender_type | int | Y | %02D | x | x | x | B |
| * | tender_amt | dec | N | %9.2F | 0 | 9999999 | x | G |
| * | acct_nbr1 | int | N | %04D | 1000 | 6000 | 1000 | G |
| * | acct_nbr2 | int | N | %08D | 1 | 999999 | 1 | G |
| # | | | | | | | | |

Update /cntl/exp2 TableOrder

| db1 | store | store_nbr | exp2 | 1 |
|---|---|---|---|---|
| db1 | store | region_nbr | exp2 | 2 |
| # | | | | |
| db1 | visit | store_nbr | exp2 | 1 |
| db1 | visit | visit_date | exp2 | 2 |
| db1 | visit | visit_nbr | exp2 | 3 |
| db1 | visit | tot_retail | exp2 | 4 |
| db1 | visit | tot_visit | exp2 | 5 |
| db1 | visit | tot_itm_cnt | exp2 | 6 |
| db1 | visit | uni_itm_cnt | exp2 | 7 |
| db1 | visit | tot_tax | exp2 | 8 |
| # | | | | |
| db1 | scan | store_nbr | exp2 | 1 |
| db1 | scan | visit_date | exp2 | 2 |
| db1 | scan | visit_nbr | exp2 | 3 |
| db1 | scan | item_nbr | exp2 | 4 |
| db1 | scan | scan_cnt | exp2 | 5 |
| db1 | scan | unit_cost | exp2 | 6 |
| db1 | scan | retail_price | exp2 | 7 |
| # | | | | |
| db1 | tender | store_nbr | exp2 | 1 |
| db1 | tender | visit_date | exp2 | 2 |
| db1 | tender | visit_nbr | exp2 | 3 |
| db1 | tender | tender_type | exp2 | 4 |
| db1 | tender | tender_amt | exp2 | 5 |
| db1 | tender | acct_nbr1 | exp2 | 6 |
| db1 | tender | acct_nbr2 | exp2 | 7 |

Update /cntl/exp2_ColRel

| exp2 | db1 | store | | 10 | | | | tblset | |
|---|---|---|---|---|---|---|---|---|---|
| exp2 | db1 | scan | | 6000 | | | | tblset | |
| exp2 | db1 | visit | | 1000 | | | | tblset | |
| exp2 | db1 | tender | | 2000 | | | | tblset | |
| exp2 | db1 | store | store_nbr | x | x | x | | CpySeq | x |
| exp2 | db1 | store | region_nbr | x | x | x | | CpySeq | x |
| # | | | | | | | | | |
| # Visit will have 10 stores * 100 visits making 1000 rows | | | | | | | | | |
| # (store numbers 1 thru 10 are repeated 100 times) | | | | | | | | | |
| exp2 | db1 | visit | store_nbr | db1 | store | store_nbr | | ExpCol | 100 |
| # | | | | | | | | | |
| # Create sequentail 500 sequential numbers then start over and create another | | | | | | | | | |
| # 500 sequential numbers for a total of 1000 visit-nbrs | | | | | | | | | |
| exp2 | db1 | visit | visit_nbr | x | x | x | | ExpColSeq | 1,500 |
| # | | | | | | | | | |
| # create 500 of the 1st visit_date in /bucket/visit_date then create another | | | | | | | | | |
| # 500 of the snd visit_date | | | | | | | | | |
| exp2 | db1 | visit | visit_date | x | x | x | | ExpColBuc | 500,2 |
| # | | | | | | | | | |
| # Create sequentail 500 sequential numbers then start over and create another | | | | | | | | | |
| # 500 sequential numbers for a total of 1000 visit-nbrs | | | | | | | | | |
| exp2 | db1 | visit | visit_nbr | x | x | x | | ExpColSeq | 1,500 |
| # | | | | | | | | | |
| # Scan will have 6000 rows over 2 days with 500 visits per day and 6 items per | | | | | | | | | |
| # visit (2 * 500 * 6) = 6000 | | | | | | | | | |
| exp2 | db1 | scan | store_nbr | db1 | visit | store_nbr | | ExpCol | 6 |
| exp2 | db1 | scan | visit_date | db1 | visit | visit_date | | ExpCol | 6 |
| exp2 | db1 | scan | visit_nbr | db1 | visit | visit_nbr | | ExpColSta | 06:36 |
| exp2 | db1 | scan | item_nbr | db1 | item | item_nbr | | CpyCol | x |
| exp2 | db1 | scan | scan_cnt | x | x | x | | CpySta | scan27 |
| exp2 | db1 | scan | unit_cost | db1 | item | cost | | CpyCol | x |
| exp2 | db1 | scan | retail_price | db1 | item | sell | | CpyCol | x |
| # | | | | | | | | | |
| exp2 | db1 | visit | tot_itm_cnt | db1 | scan | scan_cnt | | CmpSumSet | x |
| exp2 | — | | | db1 | scan | visit_nbr | | | |

-continued

```
exp2   db1   visit    uni_itm_cnt   db1   scan    visit_nbr      CmpCnt        x
exp2   db1   visit    tot_retail    db1   scan    retail_price   CmpMulSet     x
exp2   —                            db1   scan    scan_cnt
exp2   —                            db1   scan    visit_nbr
exp2   db1   visit    tot_tax       db1   visit   tot_retail     CmpMulSta     01:01
exp2   db1   visit    tot_visit     db1   visit   tot_retail     CmpSum        x
exp2   —                            db1   visit   tot_tax

exp2   db1   tender   store_nbr     db1   visit   store_nbr      ExpCol        2
exp2   db1   tender   visit_date    db1   visit   visit_date     ExpCol        2
exp2   db1   tender   visit_nbr     db1   visit   visit_nbr      ExpCol        2
exp2   db1   tender   tender_type   x     x       x              CpySta        tndr64
exp2   db1   tender   tender_amt    db1   visit   tot_visit      CmpDivSta     01:02
exp2   db1   tender   acct_nbr1     x     x       x              CpySeq        x
exp2   db1   tender   acct_nbr2     x     x       x              CpySeq        x
#***************************************************************
```

Run the Data Generator Using the Exp2 Set

```
/DG exp2
/output $ cat exp2_db1-store
100|  1|
101|  2|
102|  3|
103|  4|
104|  5|
105|  1|
106|  2|
107|  3|
108|  4|
109|  5|
/output $ head -20 exp2_db1-visit
100|20090101|100000|    121.13|    125.98|  10|  5|    4.85|
100|20090101|100001|    231.55|    245.44|  18|  7|   13.89|
100|20090101|100002|    133.46|    142.80|  19|  8|    9.34|
100|20090101|100003|     84.60|     87.14|  11|  4|    2.54|
100|20090101|100004|     26.03|     28.37|   4|  3|    2.34|
100|20090101|100005|    217.14|    225.83|  20|  9|    8.69|
100|20090101|100006|    178.43|    189.14|  12|  5|   10.71|
100|20090101|100007|    258.25|    276.33|  19|  7|   18.08|
100|20090101|100008|    169.48|    174.56|  13|  8|    5.08|
100|20090101|100009|     70.19|     76.51|   9|  4|    6.32|
100|20090101|100010|     27.86|     28.97|   9|  3|    1.11|
100|20090101|100011|    222.56|    235.91|  22|  9|   13.35|
100|20090101|100012|     53.43|     57.17|  12|  5|    3.74|
100|20090101|100013|    143.29|    147.59|  12|  7|    4.30|
100|20090101|100014|     98.07|    106.90|  22|  8|    8.83|
100|20090101|100015|    100.07|    104.07|   9|  4|    4.00|
100|20090101|100016|     24.87|     26.36|   7|  3|    1.49|
100|20090101|100017|     90.02|     96.32|  20|  9|    6.30|
100|20090101|100018|    139.37|    143.55|  10|  5|    4.18|
100|20090101|100019|    186.18|    202.94|  18|  7|   16.76|
/output $ head -20 exp2_db1-scan
100|20090101|100000|     1|  1|   29.96|   41.94|
100|20090101|100000|     2|  1|    3.00|    4.80|
100|20090101|100000|     3|  2|    1.91|    2.20|
100|20090101|100000|     4|  3|    5.00|    6.60|
100|20090101|100000|     5|  3|   13.94|   16.73|
100|20090101|100001|     6|  1|    2.29|    2.52|
100|20090101|100001|     7|  2|   28.00|   43.12|
100|20090101|100001|     8|  4|    8.87|    6.39|
100|20090101|100001|     9|  3|    2.08|    2.45|
100|20090101|100001|    10|  1|    9.46|   13.24|
100|20090101|100001|    11|  5|    3.46|    5.54|
100|20090101|100001|    12|  2|   29.97|   34.47|
100|20090101|100002|    13|  3|    5.98|    7.89|
100|20090101|100002|    14|  1|    5.44|    6.53|
100|20090101|100002|    15|  3|    4.96|    5.46|
100|20090101|100002|    16|  4|    1.35|    2.08|
100|20090101|100002|    17|  1|   18.83|   13.56|
100|20090101|100002|    18|  2|    4.96|    5.85|
100|20090101|100002|    19|  4|    6.96|    9.74|
100|20090101|100002|    20|  1|    8.96|   14.34|
/output $ head -20 exp2_db1-tender
100|20090101|100000|00|    62.99|1000|00000001|
100|20090101|100000|01|    62.99|2000|00000002|
100|20090101|100001|00|   122.72|3000|00000003|
100|20090101|100001|01|   122.72|4000|00000004|
100|20090101|100002|00|    71.40|5000|00000005|
100|20090101|100002|01|    71.40|6000|00000006|
100|20090101|100003|00|    43.57|1000|00000007|
100|20090101|100003|01|    43.57|2000|00000008|
100|20090101|100004|00|    14.19|3000|00000009|
100|20090101|100004|01|    14.18|4000|00000010|
100|20090101|100005|10|   112.92|5000|00000011|
100|20090101|100005|20|   112.91|6000|00000012|
100|20090101|100006|21|    94.57|1000|00000013|
100|20090101|100006|22|    94.57|2000|00000014|
100|20090101|100007|32|   138.16|3000|00000015|
100|20090101|100007|35|   138.17|4000|00000016|
100|20090101|100008|02|    87.28|5000|00000017|
100|20090101|100008|03|    87.28|6000|00000018|
100|20090101|100009|02|    38.26|1000|00000019|
100|20090101|100009|03|    38.25|2000|00000020|
```

Although such a system may be used to generate POS and/or retail-related data, it should be appreciated that such a system may be used in other systems to generate any other forms of data.

Example Computer Implementations

Processes described above are merely illustrative embodiments of systems that may be used to process source code. Such illustrative embodiments are not intended to limit the scope of the present invention, as any of numerous other implementations for performing the invention. None of the claims set forth below are intended to be limited to any particular implementation of a source code processing system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel Core processor, ARM Cortex processor, Qualcomm Scorpion processor, or any other type of processor. It should be appreciated that one or more of any type computer system may be used to partially or fully automate management of prepaid debit cards according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows 7 or Windows 8 operating systems available from the Microsoft Corporation, MAC OS X Snow Leopard, MAC OS X Lion operating systems available from Apple Computer, iOS, Blackberry OS, Windows Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 8:
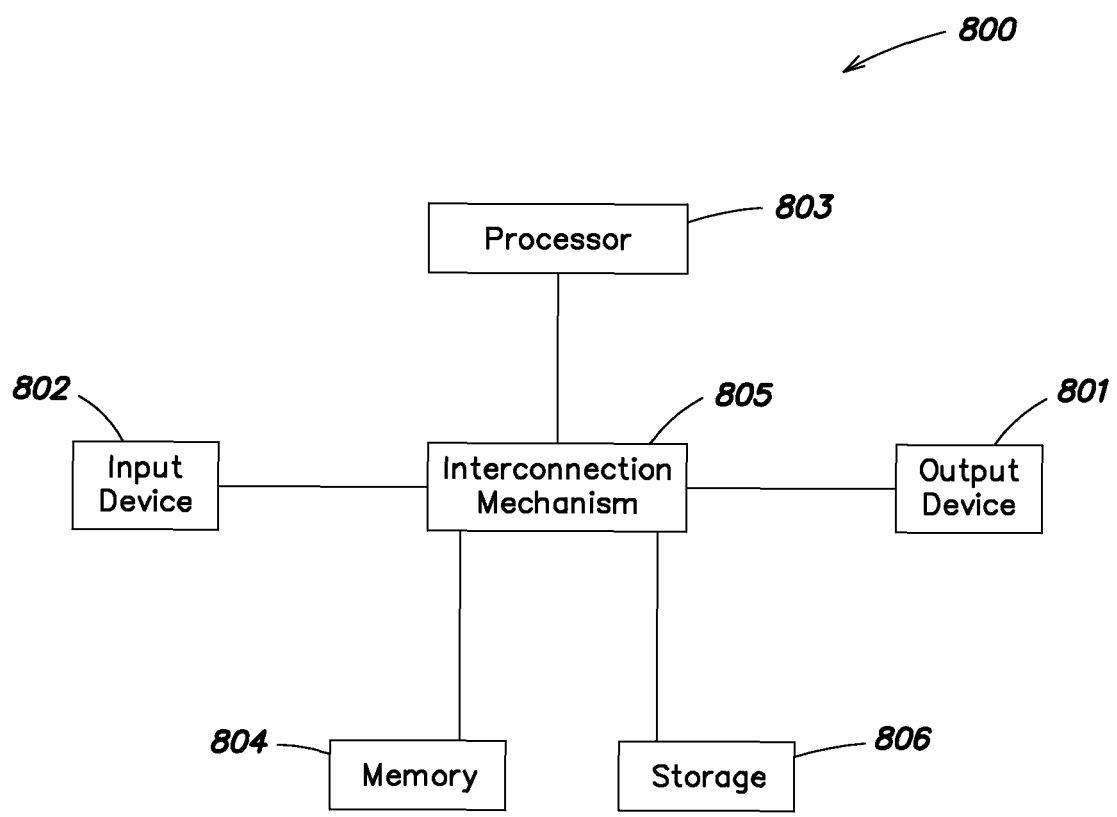
FIG. 8 shows an example computer system with which various aspects of the invention may be practiced.
Figure 9:
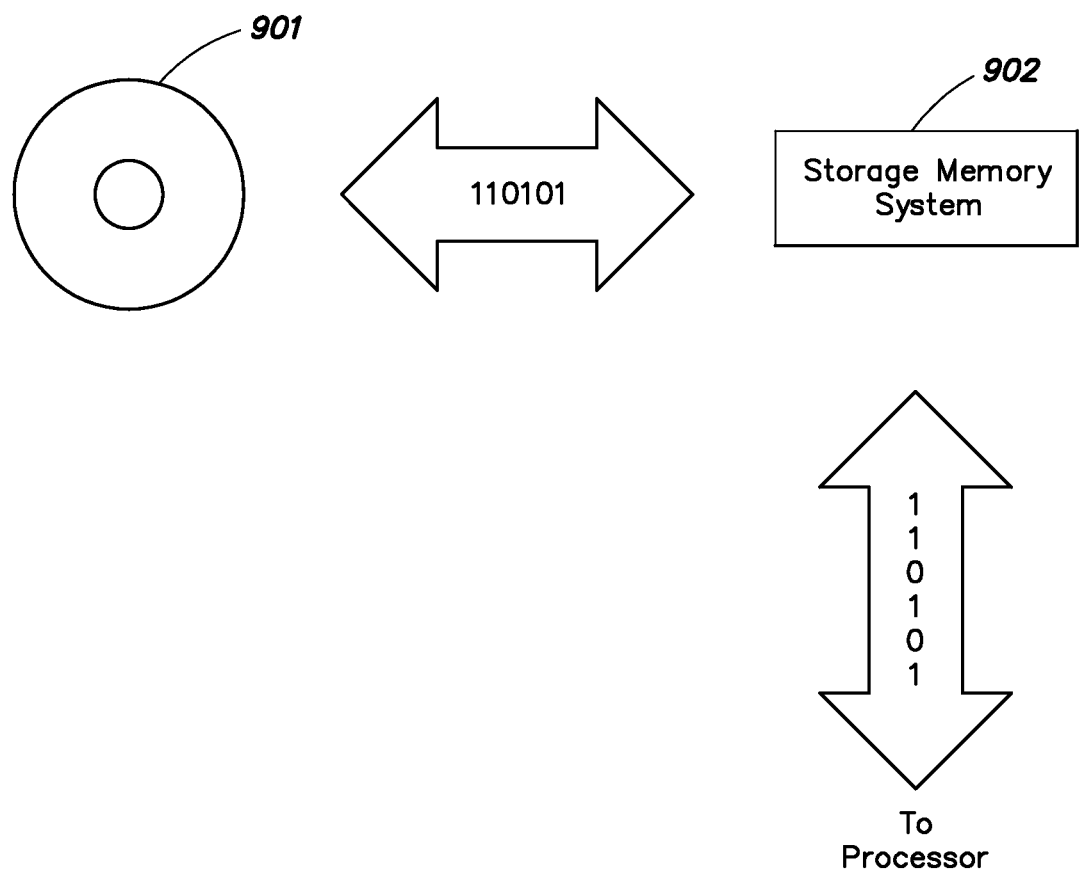
FIG. 9 shows an example storage system capable of implementing various aspects of the present invention.

Any number of systems of system 100 may be implemented on a computer system described below in relation to FIGS. 8 and 9. In particular, FIG. 8 shows an example computer system 800 used to implement various aspects. FIG. 9 shows an example storage system that may be used.

System 800 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 800 such as that shown in FIG. 8. The computer system 800 may include a processor 803 connected to one or more memory devices 804, such as a disk drive, memory, or other device for storing data. Memory 804 is typically used for storing programs and data during operation of the computer system 800. Components of computer system 800 may be coupled by an interconnection mechanism 805, which may include one or more busses (e.g., between components that are integrated within a same machine) and/or a network (e.g., between components that reside on separate discrete machines). The interconnection mechanism 805 enables communications (e.g., data, instructions) to be exchanged between system components of system 800. Computer system 800 also includes one or more input devices 802, for example, a keyboard, mouse, scanner, trackball, microphone, touch screen, and one or more output devices 801, for example, a printing device, display screen, and/or speaker. The system may also include any specialized components depending on the application, including any barcode reader, magnetic stripe reader, receipt printer, handheld or fixed scanners, pin entry devices (PED), or other device types. In addition, computer system 800 may contain one or more interfaces (not shown) that connect computer system 800 to a communication network (in addition or as an alternative to the interconnection mechanism 805).

The storage system 806, shown in greater detail in FIG. 9, typically includes a computer readable and writeable nonvolatile recording medium 901 in which signals are stored that define a program to be executed by the processor or information stored on or in the medium 901 to be processed by the program. The medium may, for example, be a disk or flash memory. Typically, in operation, the processor causes data to be read from the nonvolatile recording medium 901 into another memory 902 that allows for faster access to the information by the processor than does the medium 901. This memory 902 is typically a volatile, random access memory such as a dynamic random access memory (DRAM) or static memory (SRAM). It may be located in storage system 806, as shown, or in memory system 804, not shown. The processor 803 generally manipulates the data within the integrated circuit memory 804, 902 and then copies the data to the medium 901 after processing is completed. A variety of mechanisms are known for managing data movement between the medium 901 and the integrated circuit memory element 804, 902, and the invention is not limited thereto. The invention is not limited to a particular memory system 804 or storage system 806.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 may be also implemented using specially programmed, special purpose hardware. In computer system 800, processor 803 is typically a commercially available processor such as the well-known Pentium, Core, Core Vpro, Xeon, or Itanium class processors available from the Intel Corporation. Many other processors are available. Such a processor usually executes an operating system which may be, for example, the Windows 7 or Windows 8 operating systems available from the Microsoft Corporation, MAC OS Snow Leopard, MAC OS X Lion operating systems available from Apple Computer, iOS, Blackberry OS, Windows 7 or 8 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as, for example, Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for generating data, the system comprising:
    a data generator implemented in computer special-purpose hardware that generates one or more test databases, including:
        a column generator component adapted to build column-level data;
        a table generator component adapted to build table-level data including the column-level data;
        a component that determines an interdependency between the column-level and table-level data; and
        a scheduler that schedules generation of the column-level data and table-level data responsive to the determined interdependency between the column-level and table-level data.

2. The system according to claim 1, wherein the data generator further comprises a control that permits a user to control a number of rows that are generated for the column-level data.

3. The system according to claim 1, wherein the data generator further comprises a component adapted to generate column-level data based on a column-to-column relationship.

4. The system according to claim 1, wherein the data generator further comprises a control that permits a user to control an order of the column-level data within the table-level data.

5. The system according to claim 1, wherein the scheduler that schedules generation of the column-level data and table-level data responsive to the determined interdependency between the column-level and table-level data is adapted to schedule parallel generation of data responsive to the determined interdependency.

6. The system according to claim 1, wherein the data generator is adapted to produce data that is relationally consistent.

7. The system according to claim 1, wherein the data generator further comprises a plurality of data generator types comprising at least one of a group comprising:
    a copy generator adapted to copy column-level data;
    a computational generator adapted to determine a mathematical operation between column data; and
    an expansion generator adapted to create multiple row output data based on input row data.

8. The system according to claim 1, wherein the data generator is adapted to generate an output data set responsive to control information that specifies a size of the output data set.

9. The system according to claim 1, wherein the data generator is adapted to generate an output data set responsive to control information that specifies a statistical aspect of at least one portion of data within the output data set.

10. The system according to claim 1, wherein the data generator is adapted to generate an output data set responsive to control information that specifies uniqueness of at least one portion of the output data set in relation to other data portions of the output data set.

11. The system according to claim 1, wherein the data generator is adapted to generate an output data set responsive to control information that loads predetermined values from a data input source.

12. The system according to claim 1, wherein the data generator is adapted to generate an output data set responsive to control information that specifies an order of columns of the output data set.

13. The system according to claim 1, wherein the data generator further comprises a data generator type that is adapted to read a predefined set of values having a statistical relation to each other.

14. The system according to claim 1, wherein the data generator further comprises a data generator type that is adapted to create a row of data by multiplying column data by statistics elements.

15. The system according to claim 1, wherein the data generator further comprises a data generator type that is adapted to selectively duplicate data to expand an output data set.

16. A method for generating data, the method comprising acts of:
    generating, by a plurality of column generator components, respective columns and associated column-level data;
    generating, by a table generator component, table-level data including the respective columns and associated column-level data;
    determining an interdependency between the column-level and table-level data; and
    scheduling a generation of the column-level data and table-level data responsive to the determined interdependency between the column-level and table-level data.

17. The method according to claim 16, further comprising an act of permitting a user to control a number of rows that are generated for the column-level data.

18. The method according to claim 16, further comprising an act of generating column-level data based on a column-to-column relationship.

19. The method according to claim 16, further comprising an act of permitting a user to control an order of the column-level data within the table-level data.

20. A system for generating synthetic data for software testing, comprising:
    at least one special purpose computer for generating a process to build a set of column-level data; generating a process to build a set of table-level data; determining interdependencies between the column-level data and the table-level data; and creating a batch submission flow in response to the interdependencies.

* * * * *